Patented Mar. 14, 1944

2,344,026

UNITED STATES PATENT OFFICE 2,344,026

PROCESS FOR PRODUCING RESINS OF THE COUMARONE-INDENE TYPE

Edwin L. Cline, Philadelphia, Pa., assignor to Allied Chemical & Dye Corporation, New York, N. Y., a corporation of New York No Drawing. Application January 14, 1942, Serial No. 426,786

16 Claims. (Cl. 260—81)

This invention relates to the manufacture of resins of the coumarone-indene type, particularly low-melting-point resins of this type, having improved color and odor.

Resins of the coumarone-indene type may be prepared by polymerizing coumarone, indene, styrene or similar polymerizable substances contained in resin oils obtained from coal tar or drip oil. The most common method of preparing such resins involves effecting polymerization of the polymerizable constituents of the resin oil by the action of sulfuric acid. It has been found, however, that resins obtained by adding sulfuric acid directly to crude resin oils possess an undesirable color and odor. While the color- and odor-forming materials contained in crude resin oils may be substantially completely removed therefrom, resins obtained even from such refined oils by the action of sulfuric acid have colors and odors which, while greatly improved over those obtained from crude resin oils, are still somewhat objectionable.

The production of low-melting-point resins of the coumarone-indene type, i. e., resins having a melting point between about 10° and about 100° C., of satisfactory color and odor directly from coal tar or drip oil fractions containing polymerizable materials by catalytic polymerization with, for example, sulfuric acid has not to my knowledge been successfully accomplished. In order to obtain such low-melting-point resins, it has been thought to be necessary to blend a high-quality high-melting-point resin of the coumarone-indene type with a highly purified heavy solvent oil; low-melting point resins produced in such manner, however, display poor solubility in paraffinic solvents, a factor which tends to limit their field of usefulness.

It is an object of this invention to provide a process for the manufacture of resins of the coumarone-indene type having an improved color and odor.

It is a more specific object of this invention to provide a process for preparing low-melting-point resins of the coumarone-indene type directly from coumarone-indene type resin oils containing polymerizable constituents, which resins display good solubility in paraffin solvents.

I have made the surprising discovery that resins of the coumarone-indene type of improved color and odor may be obtained from a crude coumarone-indene type resin oil by treating the oil to remove substantially all the tar acids and tar bases therefrom, further treating the oil to remove therefrom cyclopentadiene constituents and other color-forming bodies contained therein, and subjecting the remaining oil to polymerization in the presence of an amount of an aryl sulfonic acid catalyst equivalent to at least about 1% of the weight of the oil at a temperature not greater than about 110° C. The term "cyclopentadiene constituents" is employed throughout the specification and claims to include cyclopentadiene and its homologs, dicyclopentadiene and its homologs, and addition products of cyclopentadiene with unsaturated compounds. A particularly advantageous feature of my invention lies in the fact that low-melting-point coumarone-indene resins of improved color and odor and which are soluble in paraffin solvents may be obtained thereby directly from crude coumarone-indene type resin oils. The resins obtained in the practice of my invention in every case have superior color and odor to resins of similar melting point obtained by polymerizing the same coumarone-indene type resin oil with sulfuric acid; furthermore, these resins, being soluble in paraffinic solvents, may be more widely utilized than resins obtained from sulfuric acid polymerized oils.

The crude coumarone-indene type resin oil treated in accordance with this invention may be obtained by fractionation of tars, such as coal tar, water-gas tar and oil-gas tar, from drip oil (oil which settles out of mains through which hydrocarbon gases such as coal distillation gas or water gas flow), or from coke oven distillates; it may contain such polymerizable constituents as coumarone, indene, styrene and methyl styrene, some or all of which may be present. The particular polymerizable constituents present in the oil employed will vary, depending on the boiling range thereof, its source and the pretreatment, if any, to which it is subjected. Throughout the specification and claims the term "coumarone-indene type resin oil" is employed to include oils containing some or all of the polymerizable constituents above mentioned, and in which such constituents constitute the predominant portion of the total amount of polymerizable substances. Preferably, the coumarone-indene type resin oil treated is a coal tar distillate of the type of crude "Hi-Flash" naphthas, or a drip oil fraction, boiling within the range between about 135° and about 205° C.

In accordance with my invention the crude coumarone-indene type resin oil to be treated may first be subjected to an alkaline and then an acid wash to remove tar acids and tar bases therefrom; for example, the oil may be washed with a 20% sodium hydroxide solution and thereafter treated with sulfuric acid of from 10% to 50%, e. g., 20%, concentration at a temperature of about 25° C. The oil may then be treated to remove cyclopentadiene constituents. Preferably, this is accomplished by treating the oil with sulfuric acid to remove cyclopentadiene and other color-forming bodies under conditions such that a minimum of polymerization occurs, fractionating the oil at atmospheric pressure to remove as distillate low-boiling color-forming bodies comprising cyclopentadiene formed upon dissociation of dicyclopentadiene, and then further fractionating the oil at low temperatures to remove as residue high-boiling color-forming bodies comprising cyclopentadiene addition compounds.

The sulfuric acid treatment is preferably carried out by contacting the oil with about 50° Bé. sulfuric acid in an amount equivalent to about 3% of the oil by volume for one hour at a temperature between 30° and 40° C.; however, stronger acid than 50° Bé. may be used at somewhat lower temperatures and weaker acid is effective at higher temperatures. In any event, treatment with the acid should be discontinued when the specific gravity of the oil has risen by between about 0.002 and about 0.010. The acid treatment serves to remove cyclopentadiene from the oil, as well as unidentified color bodies, but does not effect the removal of dicyclopentadiene. Activated clay may, if desired, be used in place of the sulfuric acid in the treatment.

After treatment of the oil with acid as described, the oil is then subjected to the two-step fractionation above referred to. The first fractionation is carried out at atmospheric pressure and preferably is continued up to a distillation temperature of about 150° C.; in the case of the average crude "Hi-Flash" naphtha the distillate removed by this fractionation usually amounts to from about 5% to about 10% of the crude resin oil, but in some cases may amount to about 20%. This initial fractionation step may, if desired, be accomplished during refining of the material from which the resin oil is obtained by carrying out fractional distillation of the material at atmospheric pressure up to the cut-in point for the desired crude resin oil fraction, and hence may precede the removal of the tar acids and bases.

The oil from which low-boiling color-forming bodies have been removed is then subjected to a low-temperature fractionation, preferably under a vacuum, at a low temperature not exceeding about 190° C. in order to remove as residue color-forming bodies comprising cyclopentadiene addition compounds boiling above or decomposing within the normal boiling range, i. e., the boiling range at atmospheric pressure, of the desired polymerizable constituents; a refined resin oil distillate is thus obtained. This step may also, if desired, be carried out prior to removal of tar acids and bases.

The above described fractionation procedure for removing cyclopentadiene constituents, along with other color-forming bodies, from crude resin oils is described in detail and claimed in my copending application Serial No. 305,336, filed November 20, 1939.

Polymerization of the coumarone-indene type resin oil thus treated may then be effected by adding to the oil an amount of an aryl sulfonic acid catalyst equivalent to at least about 1%, e. g., between about 1% and about 5%, preferably between about 2% and about 3%, of the weight of the oil while maintaining the temperature thereof below about 110° C. In many cases it may be desirable to dilute the oil with a suitable solvent, such as a partially refined "Hi-Flash" naphtha, prior to polymerization; the amount of this solvent added may be between about 50% and about 200% of the oil, and preferably is such that the mixture being polymerized contains polymerizable constituents in the amount of about 30% of the mixture. The aryl sulfonic acid employed is preferably benzene sulfonic acid, but may be toluene, xylene, phenol or cresol sulfonic acids or mixtures thereof; it need not be pure but may contain as much as 10% of impurities, including 2% or 3% sulfuric acid, without adversely affecting the polymerization. The catalyst, in addition to the acid, may contain diluents such as methanol or water in amounts up to about 20% of the weight of the acid present therein.

The extent of dilution, e. g., with methanol or water, of the aryl sulfonic acid and the initial temperature of the coumarone-indene type resin oil to which the catalyst is added depend to a large extent upon the desired melting point of the resin to be obtained. If high-melting-point resins, i. e., resins melting above about 100° C., are desired, no diluent is added to the acid and low initial temperatures of the order of 20° C. or lower are preferably employed. When operating in accordance with a preferred embodiment of my invention involving the production of low-melting-point resins, i. e., resins melting between about 10° and about 100° C., a diluent, e. g., methanol or water, may advantageously be added to the acid in amounts up to about 20% of the weight of the acid and relatively high initial temperatures, e. g., an initial temperature between about 50° and about 100° C., are employed. By thus suitably correlating the dilution of the acid and initial temperature of the oil, the melting point of the resin may be readily controlled. During polymerization the temperature, which tends to rise, should be maintained below about 110° C., preferably within the range of about 10° to about 90° C. It is important that the temperature be maintained below this value because the use of higher temperatures has an adverse effect upon the color of the resin produced. The time required for production of a suitable resin in accordance with this invention usually does not exceed about one hour.

When polymerization is complete the spent catalyst may be permitted to settle from the oil and the mass may then be neutralized with soda and washed with water in the customary manner. The mass may then be distilled at a temperature below about 150° C. to remove any unpolymerized or other low-boiling constituents; the oily polymers remaining in the mass may be removed by steam or vacuum distillation at temperatures of about 190° or 200° C., or may be left in the finished product. The resins obtained have uniformly good color and odor and are soluble in paraffinic solvents such as Stoddard solvent.

The following examples are illustrative of my invention. Amounts are given in parts by weight.

*Example 1.*—A close-cut crude "Hi-Flash" naphtha, distilled from carbolic oil and having a boiling range between 170° and 195° C., and from which low-boiling color-forming bodies comprising cyclopentadiene had been removed, was washed with a 20% sodium hydroxide solution and then with a 20% sulfuric acid solution to remove tar acids and tar bases, agitated for one hour with 50° Bé. sulfuric acid between 30° and 40° C., neutralized, distilled under a vacuum of about 27 inches of mercury, and material distilling under 190° C. recovered. This distillate was then diluted with an equal volume of partially refined "Hi-Flash" naphtha to form 4650 parts of an oil, about 30% of which was made up of polymerizable constituents of the coumarone-indene type. This oil was heated to about 70° C. and 93 parts of a mixture consisting of 85% crude benzene sulfonic acid (containing 91.9% benzene sulfonic acid, 1.05% sulfuric acid and 2.5% diphenyl sulfone), and 15% water were added in four equal portions to the oil over a period of three minutes. Agitation of the mass was continued for one hour while cooling the mass so as to prevent the temperature from rising above 110° C. At the end of this time the polymerized oil was permitted to settle, spent catalyst was decanted, the oil was neutralized with a 9% soda ash solution, washed with water and vacuum distilled to remove the major portion of the unpolymerized constituents. The remainder of the unpolymerized constituents was removed by steam distillation at atmospheric pressure at a still temperature of 150° C. The product obtained was a soft resin melting at about 22° C. and having an excellent color and odor; it was soluble in paraffinic solvents.

*Example 2.*—4650 parts of the coumarone-indene type resin oil-solvent mixture containing about 30% polymerizable constituents obtained as described in Example 1 were heated to about 50° C. and 93 parts of a mixture consisting of 85% of the crude benzene sulfonic acid used in Example 1 and 15% methanol were slowly mixed therewith. The mixture was agitated for one hour while the temperature was maintained below 96° C., at the end of which time the polymerized oil was treated to recover the resin as described in Example 1. The resin thus obtained melted at about 35° C. and had an excellent color and odor; it was soluble in paraffinic solvents.

*Example 3.*—4650 parts of the coumarone-indene type resin oil-solvent mixture containing about 30% polymerizable constituents obtained as described in Example 1 were heated to about 23° C. and 93 parts of the crude benzene sulfonic acid used in Example 1 were gradually added thereto. The mass was then agitated for one hour while the temperature was maintained below 56° C., at the end of which time the polymerized oil was treated to recover the resin as described in Example 1. The resin thus obtained melted at about 98° C. and had an excellent color and odor; it was soluble in paraffinic solvents.

*Example 4.*—Four portions of a coke-oven light oil fraction having a boiling range of 170° to 195° C., about 50% of which was made up of polymerizable constituents of the coumarone-indene type, chiefly indene, and from which tar acids, tar bases and cyclopentadiene constituents had been removed as described in Example 1 were polymerized using as catalyst 60° Bé. and 66° Bé. sulfuric acid, benzene sulfonic acid having a composition the same as that described in Example 1, and benzene sulfonic acid of such composition diluted with water so as to form a mixture containing 5% water; the amount of catalyst used was 2% of the weight of the oil in the case of the sulfonic acid and about 3.5% in the case of the sulfuric acid. The following table shows the results of these comparative tests:

| Test No. | Catalyst | Polymerization temperature | Melting point of resin | Color | Odor |
|---|---|---|---|---|---|
| | | °C. | °C. | | |
| 1 | Sulfonic acid | 23–56 | 98 | C-½ | Excellent. |
| 2 | Sulfonic acid and $H_2O$ | 40–71 | 53 | C-¼ | Do. |
| 3 | 60° Bé. $H_2SO_4$ | 60–65 | 51 | C-2 | Fair. |
| 4 | 66° Bé. $H_2SO_4$ | 60–65 | 91 | C-4 | Do. |

The resin scale hereinabove used is the customary resin color scale, which scale is made by mixing three stock solutions in the proportions indicated in the following table, thereby obtaining the colors indicated in this table; namely, stock solution "A" constituted of 40 cc. of 33.5% hydrochloric acid and 1560 cc. of water; stock solution "B" made by triturating 450 grams of C. P. ferric chloride ($FeCl_3.6H_2O$), 270 cc. of solution "A" and filtering, using the clear filtrate for stock solution "B"; and stock solution "C" made by triturating 60 grams of C. P. cobalt chloride ($CoCl_2.6H_2O$) and 60 cc. of solution "A" and filtering, using the filtrate for stock solution "C."

*Volumes in cubic centimeters*

| Color number | A | B | C | Water | Standard C series |
|---|---|---|---|---|---|
| C-1/16 | 21 | | | | 3 of #¼ |
| C-⅛ | 18 | | | | 6 of #¼ |
| C-¼ | 12 | | | | 12 of #¼ |
| C-⅜ | 6 | | | | 18 of #¼. |
| C-½ | 125 | 0.5 | 0.50 | | |
| C-¾ | | | | | 12 of #½ plus 12 of #1 |
| C-1 | 125 | 1.0 | 0.75 | | |
| C-1¼ | | | | | 12 of #1 plus 12 of #1½ |
| C-1½ | 125 | 1.4 | 0.95 | | |
| C-2 | 125 | 2.0 | 1.25 | | |
| C-2½ | 125 | 2.8 | 1.60 | | |
| C-3 | 125 | 4.0 | 2.00 | | |
| C-3½ | 15 | 6.0 | 2.00 | 110 | |
| C-4 | 15 | 8.0 | 2.00 | 110 | |

The solutions should be mixed well and about 25–28 cc. of each of the above indicated mixtures placed in a 1 oz. test bottle, each bottle labeled with its number, and the bottle sealed with sealing wax to prevent evaporation of water and HCl.

To determine the color of a resin, a 2-gram sample thereof is dissolved in 25 cc. of benzol and the depth of the color of the resin solution thus produced is compared with the standard colors. If the sample lies between two consecutive numbers, its color is reported as the higher one.

These results conclusively demonstrate that resins of improved color and odor are obtained using the catalysts of my invention in place of sulfuric acid.

It will be evident from the above that my invention provides a simple and effective method of obtaining resins of the coumarone-indene type of improved color and odor, particularly low-melting point resins having these improved characteristics.

Since certain changes may be made in carrying out the above process without departing from the scope of the invention, it is intended that all matter contained in the above description shall be interpreted as illustrative and not in a limiting sense.

I claim:

1. A process for the production of resins of the coumarone-indene type of improved color and odor which comprises subjecting a resin oil, the polymerizable constituents of which comprise predominantly polymerizable material selected from the group consisting of coumarone, indene, styrene and their homologs, and from which substantially all the tar acids, tar bases and cyclopentadiene constituents have been removed to polymerization in the presence of an amount of an aryl sulfonic acid catalyst equivalent to at least about 1% of the weight of the oil at a temperature not greater than about 110° C.

2. A process for the production of resins of the coumarone-indene type of improved color and odor which comprises subjecting a resin oil, the polymerizable constituents of which comprise predominantly polymerizable material selected from the group consisting of coumarone, indene, styrene and their homologs, and from which substantially all the tar acids, tar bases and cyclopentadiene constituents have been removed to polymerization in the presence of an amount of a benzene sulfonic acid catalyst equivalent to at least about 1% of the weight of the oil at a temperature not greater than about 110° C.

3. A process for the production of resins of the coumarone-indene type of improved color and odor which comprises treating a resin oil, the polymerizable constituents of which comprise predominantly polymerizable material selected from the group consisting of coumarone, indene, styrene and their homologs, and which contains tar acids, tar bases and cyclopentadiene constituents, to remove substantially all the tar acids, tar bases and cyclopentadiene constituents therefrom, and subjecting the treated oil to polymerization in the presence of an amount of an aryl sulfonic acid catalyst equivalent to between about 1% and about 5% of the weight of the oil at a temperature not greater than about 110° C.

4. A process for the production of resins of the coumarone-indene type of improved color and odor which comprises treating a resin oil, the polymerizable constituents of which comprise predominantly polymerizable material selected from the group consisting of coumarone, indene, styrene and their homologs, and which contains tar acids, tar bases and cyclopentadiene constituents, to remove substantially all the tar acids, tar bases and cyclopentadiene constituents therefrom, and subjecting the treated oil to polymerization in the presence of an amount of a benzene sulfonic acid catalyst equivalent to between about 1% and about 5% of the weight of the oil at a temperature not greater than about 110° C.

5. A process for the production of low-melting-point resins of the coumarone-indene type of improved color and odor and soluble in paraffinic solvents which comprises treating a resin oil, the polymerizable constituents of which comprise predominantly polymerizable material selected from the group consisting of coumarone, indene, styrene and their homologs, and which contains tar acids, tar bases and cyclopentadiene constituents, to remove substantially all the tar acids, tar bases and cyclopentadiene constituents therefrom, and subjecting the treated oil to polymerization in the presence of an amount of an aryl sulfonic acid catalyst equivalent to between about 1% and about 5% of the weight of the oil at a temperature between about 50° and about 100° C.

6. A process for the production of low-melting-point resins of the coumarone-indene type of improved color and odor and soluble in paraffinic solvents which comprises treating a resin oil, the polymerizable constituents of which comprise predominantly polymerizable material selected from the group consisting of coumarone, indene, styrene and their homologs, and which contains tar acids, tar bases and cyclopentadiene constituents, to remove substantially all the tar acids, tar bases and cyclopentadiene constituents therefrom, and subjecting the treated oil to polymerization in the presence of an amount of a benzene sulfonic acid catalyst equivalent to between about 1% and about 5% of the weight of the oil at a temperature between about 50° and about 100° C.

7. A process for the production of resins of the coumarone-indene type of improved color and odor which comprises treating a resin oil, the polymerizable constituents of which comprise predominantly polymerizable material selected from the group consisting of coumarone, indene, styrene and their homologs, and which contains tar acids, tar bases and cyclopentadiene constituents, to remove substantially all the tar acids and tar bases therefrom, treating the oil with sulfuric acid to remove color-forming bodies without effecting substantial polymerization of the polymerizable constituents of the oil, subjecting the oil to fractionation at atmospheric pressure to separate as distillate low-boiling color-forming bodies, subjecting the residual oil to low-temperature fractionation to separate as residue high-boiling color-forming bodies comprising cyclopentadiene addition compounds, and subjecting the distillate thus obtained to polymerization in the presence of an amount of a benzene sulfonic acid catalyst equivalent to between about 2% and about 3% of the weight of the oil at a temperature not exceeding 110° C.

8. A process for the production of low-melting-point resins of the coumarone-indene type of improved color and odor and soluble in paraffinic solvents, which comprises treating a resin oil, the polymerizable constituents of which comprise predominantly polymerizable material selected from the group consisting of coumarone, indene, styrene and their homologs, and which contains tar acids, tar bases and cyclopentadiene constituents, to remove substantially all the tar acids and tar bases therefrom, treating the oil with sulfuric acid to remove color-forming bodies without effecting substantial polymerization of the polymerizable constituents of the oil, subjecting the oil to fractionation at atmospheric pressure to separate as distillate low-boiling color-forming bodies, subjecting the residual oil to vacuum fractionation at a distillation temperature not exceeding about 190° C. to separate as residue high-boiling color-forming bodies comprising cyclopentadiene addition compounds, heating the distillate thus obtained to between about 50° and about 100° C. and subjecting it to polymerization in the presence of an amount of a benzene sulfonic acid catalyst equivalent to between about 2% and about 3% of the weight of the oil at a temperature between about 50° and about 100° C.

9. A process for the production of low-melting-point resins of the coumarone-indene type of improved color and odor and soluble in paraffinic solvents, which comprises treating a coal tar cut boiling between about 135° and about 205° C. to remove substantially all the tar acids and tar bases therefrom, treating the cut with sulfuric acid to remove color-forming bodies without effecting substantial polymerization of the polymerizable constituents of the cut, subjecting the cut to fractionation at atmospheric pressure to separate as distillate low-boiling color-forming bodies, subjecting the residual cut to vacuum fractionation at a distillation temperature not exceeding about 190° C. to separate as residue high-boiling color-forming bodies comprising cyclopentadiene addition compounds, heating the distillate thus obtained to between about 50° and about 100° C., subjecting it to polymerization in the presence of an amount of a benzene sulfonic acid catalyst equivalent to between about 2% and about 3% of the weight of the oil at a temperature between about 50° and about 100° C., and recovering the resin therefrom.

10. A process for the production of low-melting-point resins of the coumarone-indene type of improved color and odor and soluble in paraffinic solvents, which comprises treating a coal tar cut boiling between about 135° and about 205° C. and from which low-boiling color-forming bodies comprising cyclopentadiene have been separated to remove substantially all the tar acids and bases therefrom, treating the cut with sulfuric acid to remove color-forming bodies without effecting substantial polymerization of the polymerizable constituents thereof, subjecting the cut to vacuum fractionation at a distillation temperature not exceeding about 190° C. to separate as residue high-boiling color-forming bodies comprising cyclopentadiene addition compounds, heating the distillate thus obtained to between about 50° and about 100° C., subjecting it to polymerization in the presence of an amount of a benzene sulfonic acid catalyst equivalent to between about 2% and about 3% of the weight of the oil at a temperature between about 50° and about 100° C., and recovering the resin therefrom.

11. A process for the production of resins of the coumarone-indene type of improved color and odor which comprises treating a resin oil, the polymerizable constituents of which comprise predominantly polymerizable material selected from the group consisting of coumarone, indene, styrene and their homologs, and which contains tar acids, tar bases and cyclopentadiene constituents, to remove substantially all the tar acids and tar bases therefrom, treating the oil with sulfuric acid to remove color-forming bodies without effecting substantial polymerization of the polymerizable constituents of the oil, subjecting the oil to fractionation at atmospheric pressure to separate as distillate low-boiling color-forming bodies, subjecting the residual oil to low-temperature fractionation to separate as residue high-boiling color-forming bodies comprising cyclopentadiene addition compounds, and subjecting the distillate thus obtained to polymerization in the presence of an amount of a catalyst containing benzene sulfonic acid and an amount of water not in excess of about 20% of the weight of the acid equivalent to between about 2% and about 3% of the weight of the oil at a temperature not exceeding 110° C.

12. A process for the production of resins of the coumarone-indene type of improved color and odor which comprises treating a resin oil, the polymerizable constituents of which comprise predominantly polymerizable material selected from the group consisting of coumarone, indene, styrene and their homologs, and which contains tar acids, tar bases and cyclopentadiene constituents, to remove substantially all the tar acids and tar bases therefrom, treating the oil with sulfuric acid to remove color-forming bodies without effecting substantial polymerization of the polymerizable constituents of the oil, subjecting the oil to fractionation at atmospheric pressure to separate as distillate low-boiling color-forming bodies, subjecting the residual oil to low-temperature fractionation to separate as residue high-boiling color-forming bodies comprising cyclopentadiene addition compounds, and subjecting the distillate thus obtained to polymerization in the presence of an amount of a catalyst containing benzene sulfonic acid and an amount of methanol not in excess of about 20% of the weight of the acid equivalent to between about 2% and about 3% of the weight of the oil at a temperature not exceeding 110° C.

13. A process for the production of low-melting-point resins of the coumarone-indene type of improved color and odor and soluble in paraffinic solvents, which comprises treating a coal tar cut boiling between about 135° and about 205° C. to remove substantially all the tar acids and tar bases therefrom, treating the cut with sulfuric acid to remove color-forming bodies without effecting substantial polymerization of the polymerizable constituents of the cut, subjecting the cut to fractionation at atmospheric pressure to separate as distillate low-boiling color-forming bodies, subjecting the residual cut to vacuum fractionation at a distillation temperature not exceeding about 190° C. to separate as residue high-boiling color-forming bodies comprising cyclopentadiene addition compounds, heating the distillate thus obtained to between about 50° and about 100° C., subjecting it to polymerization in the presence of an amount of a catalyst containing benzene sulfonic acid and an amount of water not in excess of about 20% of the weight of the acid equivalent to between about 2% and about 3% of the weight of the oil at a temperature between about 50° and about 100° C., and recovering the resin therefrom.

14. A process for the production of low-melting-point resins of the coumarone-indene type of improved color and odor and soluble in paraffinic solvents, which comprises treating a coal tar cut boiling between about 135° and about 205° C. to remove substantially all the tar acids and tar bases therefrom, treating the cut with sulfuric acid to remove color-forming bodies without effecting substantial polymerization of the polymerizable constituents of the cut, subjecting the cut to fractionation at atmospheric pressure to separate as distillate low-boiling color-forming bodies, subjecting the residual cut to vacuum fractionation at a distillation temperature not exceeding about 190° C. to separate as residue high-boiling color-forming bodies comprising cyclopentadiene addition compounds, heating the distillate thus obtained to between about 50° and about 100° C., subjecting it to polymerization in the presence of an amount of a catalyst containing benzene sulfonic acid and an amount of methanol not in excess of about 20% of the weight of the acid equivalent to between about 2% and about 3% of the weight of the oil at a temperature between about 50° and about 100° C., and recovering the resin therefrom.

15. A process for the production of low-melting-point resins of the coumarone-indene type of improved color and odor and soluble in paraffinic solvents, which comprises treating a coal tar cut boiling between about 135° and about 205° C. and from which low-boiling color-forming bodies comprising cyclopentadiene have been separated therefrom, treating the cut with sulfuric acid to remove color-forming bodies without effecting substantial polymerization of the polymerizable constituents thereof, subjecting the cut to vacuum fractionation at a distillation temperature not exceeding about 190° C. to separate as residue high-boiling color-forming bodies comprising cyclopentadiene addition compounds, heating the distillate thus obtained to between about 50° and about 100° C., subjecting it to polymerization in the presence of an amount of a catalyst containing benzene sulfonic acid and an amount of water not in excess of about 20% of the weight of the acid equivalent to between about 2% and about 3% of the weight of the oil at a temperature between about 50° and about 100° C., and recovering the resin therefrom.

16. A process for the production of low-melting-point resins of the coumarone-indene type of improved color and odor and soluble in paraffinic solvents, which comprises treating a coal tar cut boiling between about 135° and about 205° C. and from which low-boiling color-forming bodies comprising cyclopentadiene have been separated to remove substantially all the tar acids and bases therefrom, treating the cut with sulfuric acid to remove color-forming bodies without effecting substantial polymerization of the polymerizable constituents thereof, subjecting the cut to vacuum fractionation at a distillation temperature not exceeding about 190° C. to separate as residue high-boiling color-forming bodies comprising cyclopentadiene addition compounds, heating the distillate thus obtained to between about 50° and about 100° C., subjecting it to polymerization in the presence of an amount of a catalyst containing benzene sulfonic acid and an amount of methanol not in excess of about 20% of the weight of the acid equivalent to between about 2% and about 3% of the weight of the oil at a temperature between about 50° and about 100° C., and recovering the resin therefrom.

EDWIN L. CLINE.